United States Patent

[11] 3,536,238

[72] Inventors Seiya Iwama;
 Zentaro Kawata, Yokkaichi-shi; Toshiyuki Nakagawa, Nagoya; Katsumi Okamoto, Iwakuni-shi, Japan
[21] Appl. No. 596,882
[22] Filed Nov. 25, 1966
[45] Patented Oct. 27, 1970
[73] Assignee Mitsui Petrochemical Industries, Ltd. Tokyo, Japan
 a Japanese corporation
[32] Priority Nov. 27, 1965, Nov. 15, 1966
[33] Japan
[31] 40/96,123 and 41/74,634

[54] APPARATUS FOR PRODUCING FIBROUS MATERIAL SLITTINGLY PROVIDED WITH CONTINUOUS MESHES
1 Claim, 13 Drawing Figs.
[52] U.S. Cl...................................................... 225/97;
 28/1; 57/31, 57/167; 83/660; 225/3
[51] Int. Cl...................................................... B26f 3/02

[50] Field of Search............................................ 57/140, 31, 167, 32, 157, 155; 28/1-F, 72; 83/660; 225/3, 97

[56] References Cited
UNITED STATES PATENTS
| | | | |
|---|---|---|---|
| 3,253,072 | 5/1966 | Scragg et al. ................ | 28/1-F |
| 3,273,329 | 9/1966 | Scragg.......................... | 57/140 |
| 3,273,771 | 9/1966 | Beaumont.................... | 28/1-F |

Primary Examiner—John Petrakes
Attorney—Sherman and Shalloway

ABSTRACT: An apparatus for producing pliable and strong reticulated tape which is slittingly provided with continuous meshes wherein the mesh structure is highly uniform.

Such apparatus is one which comprises a rotary slitting member disposed between two pairs of nip rolls, said slitting member being equipped with the body portion and sets of slitting blades spaced at predetermined intervals; a supporting member longitudinally slidable; and a screw member for adjusting longitudinally the position of the sets of slitting blades.

Patented Oct. 27, 1970
Fig. 1-A
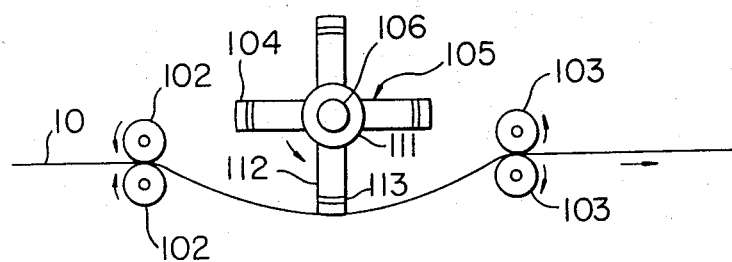
Fig. 1-B
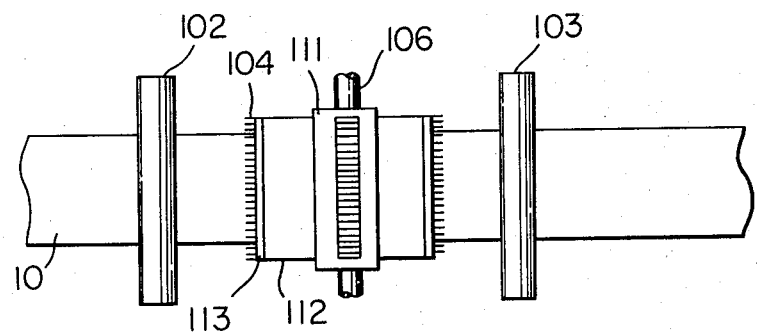
Fig. 2
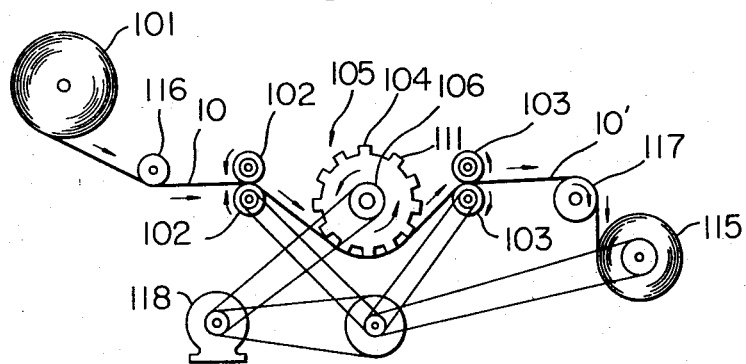

Fig. 3-A
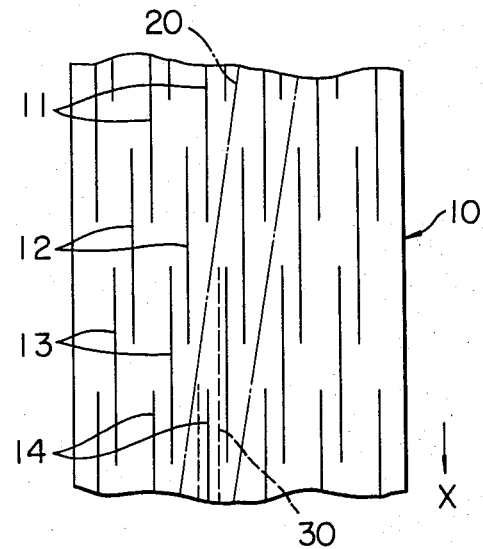
Fig. 3-B
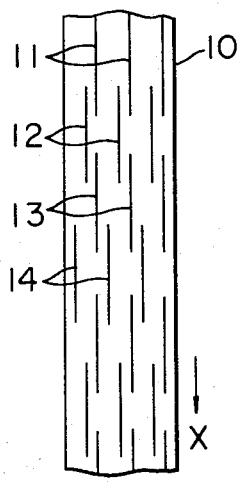
Fig. 3-C
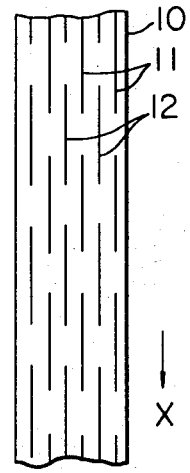

Patented Oct. 27, 1970 3,536,238
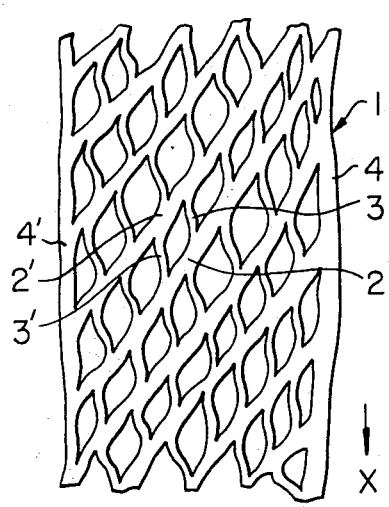
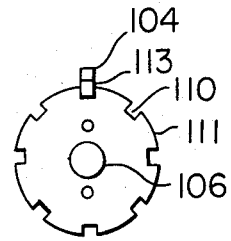
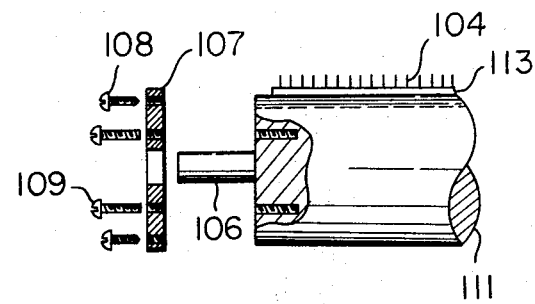
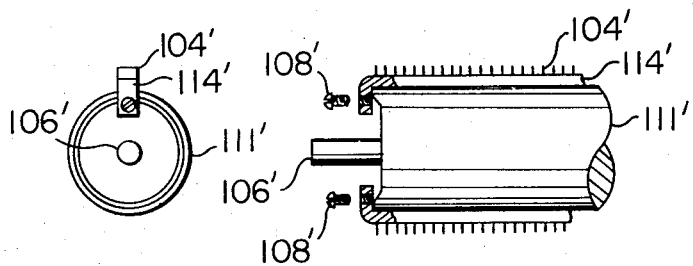
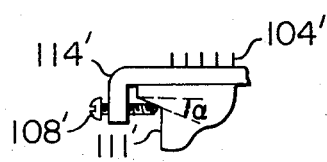
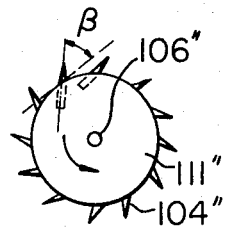

APPARATUS FOR PRODUCING FIBROUS MATERIAL SLITTINGLY PROVIDED WITH CONTINUOUS MESHES

This invention relates to a method and apparatus for producing novel pliable and strong reticulated tapes which are slittingly provided with continuous meshes whose mesh structure is highly uniform.

The production of fibrous materials by extruding a thermoplastic resin as a film or strip and thereafter splitting up this film or strip has been known heretofore. A typical prior art method is one in which a synthetic high molecular weight material is stretched and made into a fibrillated film, following which this fibrillated film is subjected to a transverse frictional or mechanical force to split up the film into fibers. According to a method of this sort however, the breaks in the film occur in most cases in an irregular fashion due to the uniformity of the film and nonuniformity of the force that is applied, and hence the meshes formed are usually exceedingly irregular. Moreover, since the split fiber formed by this process tends to become shaggy, there is the drawback that in its handling it becomes involved in such difficulties as becoming wound up on the rolls.

According to another known method, an unstretched film of a thermoplastic synthetic resin is formed, in which small slits are then formed, following which the film is stretched in the longitudinal as well as transverse directions to form reticulated tapes. In this method however, for increasing the tenacity of the reticulated tapes, the stretching must be carried out at a considerably high stretch ratio. On the other hand, since it is practically impossible to stretch the whole of the slitted film uniformly, breakages occur locally in the meshes, with the consequence that a reticulated tape is provided which is nonuniform and full of shagginess such as to make it unfit for spinning or weaving operations.

Thus, as hereinbefore described, it was fundamentally a difficult matter to produce reticulated tapes having uniform meshes and a fine nap such as could be spun and woven to advantage. Moreover, it was difficult to produce reticulated tapes with high productive efficiency.

It is therefore a primary object of this invention to provide a method of producing reticulated tapes having throughout the fiber uniformly sized meshes and a fine and uniform nap to an optional degree such as to be useful in its handling and use. The term reticulated tapes, as used herein, comprehends all of the netlike materials obtained by this invention and includes even those whose width is on the order of 1,000 mm.

Another object is to provide a method and apparatus by which it is possible to produce with high efficiency and without the employment of any special and complicated equipment, useful reticulated tapes which consist of the aforesaid mesh structure possessing uniformly sized meshes and a fine and uniform nap to an optional degree such as to render them useful for spinning and weaving operations.

Other objects and advantages of the invention will become apparent from the following description.

The foregoing objects are attained by a method of producing reticulated tapes according to this invention which is characterized by stretching a tape of a thermoplastic synthetic organic polymer in the longitudinal direction at a stretch ratio of 3:1 — 10:1 and providing in said stretched tape by means of slitting blades implanted in a rotating member, a plurality of sets of slits in which the slits are in parallel to the direction of stretch and spaced substantially equidistantly from each other in the transverse direction, the disposition of said sets being such that each set is successively staggered a small distance transversely of its preceding set and such that the slits overlap in the longitudinal direction.

Further, there is provided according to this invention an apparatus for slitting stretched synthetic resin tape, which comprises two pairs of nip rolls disposed with an interval therebetween and a rotating slitting member disposed between said two pairs of nip rolls, the surface of said rotating member which is mounted on a drive shaft being equipped with a plurality of slitting blades, said rotating slitting member rotating in the same direction as the direction of travel of the stretched tape and the peripheral speed of its slitting blades being greater than the speed of travel of said tape, said rotating slitting member being equipped with a plurality of sets of slitting blades which are disposed in parallel to the circumferential direction and substantially at equidistant intervals in the axial direction, said sets being disposed such that the file of blades is successively staggered a small distance transversely of its preceding set, said sets being in spaced relation to each other in the circumferential direction.

For a better understanding of this invention, reference will be had to the accompanying drawings, wherein:

FIGS. 1-A and 1-B are respectively simplified side and plan views illustrating the relationship between the stretched tape material, and the rotating slitting member and the two pairs of nip rolls, which are the essential parts of the invention apparatus;

FIG. 2 is a schematic side view illustrating the course of the tape material in actual practice, along with the arrangement whereby the nip rolls, rotating slitting member and split fiber windup part are driven by the motor;

FIGS. 3 (A — C) are views showing several typical examples of the slit patterns of various sort that are formed by means of the invention apparatus;

FIG. 4 is a view showing the form of network obtained by spreading out the split fiber of FIG. 3-A transversely;

FIGS. 5-A and 5-B are front and side views, respectively, illustrating a preferred mode of the rotating slitting member, an essential part of the invention apparatus;

FIGS. 6 (A — C) are respectively front, side and partly magnified side views of another mode of the rotating slitting member which can be employed in the invention apparatus; and FIG. 7 is a front view of a still another mode of the rotating slitting member which can be employed.

According to this invention, the film, tape or strip of the material synthetic organic high molecular weight polymer, preferably a polyolefin such as polyethylene or polypropylene, is stretched to a stretch ratio of 3:1 — 10:1. This stretching of the strip can be carried out by using the technique that is customarily employed in stretching films. For instance, the stretching can be readily accomplished by passing said strip between two pairs of rotating rolls of differing peripheral speed at a temperature above room temperature but below the softening temperature of the polymer from which said strip has been made. In this case, hot rolls, a hot plate, a heated air bath or the known heating media such as polyethylene glycol and glycerin can also be used for heating the strip.

Split fibers can be obtained by slitting the so obtained stretched tape material with specific slits using the invention apparatus. This slitting process will be described below in connection with the description of the apparatus.

The essential parts of the apparatus used in this invention are illustrated in FIGS. 1-A, 1-B, and 2. In these FIGS., between two pairs of nip rolls 102 and 103 there is disposed mounted on a drive shaft 106 a rotating slitting member whereon are equipped a plurality of slitting blades 104. At below (for convenience of description the terms "above", "below", "left" and "right" will be used herein, but it is to be understood that these terms merely indicate the relative positions) the rotating slitting member, a supporting means comprising an endless belt, usually of elastic material, can be provided for supporting the stretched tape material 10. Drive shaft 106 rotates in the same direction as that of the stretched tape which is transferred by means of nip rolls 102 and 103, the peripheral speed of the slitting blades 104 being so adjusted as to be greater than the speed of transfer of the stretched tape 10. The previously noted degree of nip can also be adjusted by varying the ratio of the peripheral speed to the speed of transfer. If the setup is so designed that the drive shaft 106, the two pairs of nip rolls 102, 103 and the windup part 115 are driven by a common prime mover 118, for example, an alternating current motor, it would be convenient, since the adjustment of the relative speeds would be simplified. Referring to FIG. 2, the roll of the material stretched tape 101 is successively unwound into a single strip, after which it passes through the nip rolls 102 and, upon contact with the blades 104 of the rotating slitting member rotating in the counterclockwise direction, is slitted to become a split fiber 10, and thereafter passes via nip rolls 103 to become wound up onto the windup part 115. In this case, guide rolls 116 and 117 can also be interposed. Further, better slitting results can be obtained if the stretched tape 10, in contacting the slitting member, is brought into contact with letter in a zone which is on the order of one-third to one-tenth of the circumference described by said member.

The rotating slitting member is equipped with sets of slitting blades 104 which are in parallel to the circumferential direction and substantially equidistant from each other in the axial direction. The positional relationship between the sets of the slitting blades is so chosen that the file (The disposition in a plane at right angles to the shaft to be termed "file".) of slitting blades is such that the blade in one of the sets is in a phase shifted relative of the corresponding blade in the preceding set of slitting blades, a small distance in the axial direction, i.e., a distance equal to about one-half the distance between the blades of a same set.

FIGS. 3 (A —C) illustrate three typical examples of the slit forms of the reticulated tapes that are produced by the method and apparatus of this invention. Not only these slit forms but a great variety of other types of slit forms can be produced by the apparatus of this invention. The slit form shown in FIG. 3-A is the one which is most widely adopted of the slit forms that can be made by the invention apparatus. In this structure, there are formed relatively of the group of slits 11, which are disposed equidistantly from each other in the transverse direction, a group of equidistantly disposed slits 12 in a position such as to partly overlap and moreover be in a position shifted a small interval in the axial direction, this structure being successively repeated. The feature of these slits resides in the point that the interval between each in the longitudinal direction is great, with the consequence that breakages at that part between the slits do not easily occur even by application of an external force. The filament having these slits is a split fiber which excels greatly in tenacity. The slits shown in FIGS. 3-B and 3-C do not have intervals between the slits as great as that of the pattern shown in FIG. 3-A, and hence the tenacity of the network is not so great as that of the latter, but for those cases in which the product is to be used for purposes which do not require that the intervals between the slits in the longitudinal direction be great, the slits of these pattern fully serve their purpose.

FIG. 4 illustrates the network which is formed when the slitted stretched tape (split fiber) is spread out transversely. In this network, in that part lying between the edge strips 4, 4' running along both sides in the longitudinal direction there is observed a structure consisting of relatively thick filaments 2, 2' which are connected with relatively thin filaments 3. The thick single filaments 2 which lie in parallel to each other are biased to the stretching direction X, their ends merging into the edge strips 4, 4' to integrate the whole structure. On the other hand, as shown in FIG. 4, the thin single filaments 3 branch from one of the thick single filaments 2' and merge into one of the other single filaments 2 to connect the thick single filaments together, the thin single filaments running in parallel with each other with a small interval intervening.

In FIG. 3-A, the connecting portion 20 (indicated by the line ⸺ ⸺ ⸺) in the oblique direction of the slitted stretched film forms a relatively thick strand (2 in FIG. 4), and the connecting portion 30 (indicated by the line ⸺ ⸺ ⸺) in the longitudinal direction forms a relatively thin strand (3 in FIG. 4).

In the valuable reticulated tapes obtained by this invention, the dimension of the meshes in their longest direction is usually from 3 mm. to 30 mm. On the other hand, the size of the thick single filaments of these meshes is generally 10 —50 deniers, whereas the size of the thinner single filaments is generally 3 —20 deniers.

The material stretched tape used in this invention, prior to its slitting, usually has a width of 3 —1,000 mm.

If the slitted stretched tape is one whose width is relatively narrow or is one whose slit interval is small, it can be used as a split fiber without any further operations. On the other hand, when a tape of relatively large width has been used as the stretched tape material or when the interval between the slits has been made great, the product, a split fiber which can be referred to as a split tape, is used, in most cases, folded along the direction of the stretch in the widthwise direction. In any event, the slit tape obtained in any of these instances, if spread out transversely, will exhibit a network pattern such as illustrated in FIG. 4 or one similar thereto.

The reticulated tapes obtained by means of this invention can be directly used as a multifilament, i.e., as a cord, rope or string, or suitably used as material for woven goods such as canvas, filter cloth and bags for packaging heavy weight materials.

It was also found however that the split fibers provided by this invention could be widely applied to those fields in which spun yarn has hitherto been used.

Namely, when the invention reticulated tape, and particularly preferably one which has been formed from a relatively wide stretched tape, is, after being spread out, out in the lengthwise direction at intervals in the widthwise direction and thereafter the individual portions of the cut reticulated tape are twisted, a yarn material having the appearance of spun yarn is provided.

The good reticulated tape according to this invention comprises, as shown in FIG. 4, a network composed of a plurality of relatively thick single filaments lying in parallel to each other and biased to the direction of the stretch and thin single filaments which being interposed between the thick single filaments serve to connect the latter together, with the consequence that when this reticulated tape is cut into given widths with the reticulated tape in its spread out state, the thick single filaments in most cases are cut into nearly uniform lengths. Hence, when this cut portion is twisted, the thick single filaments which had been cut into nearly uniform length are twisted together to provide a yarn whose feel is similar to of a yarn consisting of staple yarn twisted together. Again, instead of cutting the split yarn as hereinbefore described, it can be torn into shreds along the lengthwise direction. Now, if this shredded reticulated tape is twisted, a similar product as that obtained by cutting can be produced.

Further, if desired, the reticulated tapes obtained by means of the method and apparatus of this invention can be imparted bulkiness by subjecting the fibers to a crimping treatment. For instance, the stretched tape, prior to its slitting, can be passed through one or more pairs of heated embossing rolls to form minute wrinkles widthwise of the tape, then subjected to the aforesaid slitting operation of this invention and thereafter shrunk by heating, thereby imparting 10 —20 crimps per inch in the lengthwise direction of the fiber. Alternatively, this order can be reverse. Namely, a slitted stretched tape, i.e., split fiber, can be passed through the embossing rolls and thereafter be shrunk; thereby imparting crimps to the split fiber.

The reticulated tape which has been imparted crimps in this manner is bulky, and hence a fabric obtained therefrom greatly surpasses the fabric woven from the conventional stretched tape in its warmth retaining and moisture absorption properties.

Of the parts making up the apparatus of this invention, a description, in particular, of preferred modes of the rotating slitting member will be given below.

FIGS. 5 (A —B) and FIGS. 6 (A —C) illustrate in both instance modes which are suitably employed.

Referring first to FIGS. 5-A and 5-B, the body proper III is provided with a plurality of grooves 110 which are disposed in parallel to the shaft. To this are detachably fitted supporting member 113 where on are implanted the sets of slitting blade 104.

FIG. 5-A is a front view as seen axially. Flange 107 shown in FIG. 5-B is secured detachably to a shaft 106 of the body proper 111 by way of setscrews 109. On the other hand, at close to the rim of the flange 107 there are provided screws 108 which clasp the supporting members 113 and serve to adjust the position of these members (the phase of the blades) in the axial direction.

Referring to the other preferred mode, which is shown in FIGS. 6 (A —C), FIG. 6-A is a front view of the body proper 111', as seen axially, FIG. 6-B is a side view thereof and FIG. 6-C is a partially magnified side view of that part where a supporting member 114' is secured to the body proper 111'.

In the case of the rotating slitting member shown in FIGS. 6 (A —C), grooves are not provided in the body proper 111', but instead the supporting members 114' are made into an angular U-shaped configuration which is long in the transverse direction. Further, the two end surfaces of the body proper 111' are provided with a projecting rim as shown in FIG. 6-C, thus making it possible to secure the angular, transversely long U-shaped supporting members 114' to the body proper 111' in the manner shown, as well as to make it possible to adjust the position of the supporting members 114' (phase of the blades) in the axial direction. As is apparent from FIG. 6-C, the inner side of the projecting rims of the body proper 111' are provided with an inclined surface having an angle of alpha degrees. Thus, when screws 108' are screwed against the inclined inner surface of the projecting rim, the supporting member 114' is secured to the body proper 111' by means of the component force at right angles to the shaft. And at the same time the position of the supporting members 114' in the axial direction are adjusted.

Thus in the aforesaid two modes of the rotating slitting member, the supporting members 114, 114' can be attached and detached freely from the body proper, and especially in the case of the one shown in FIGS. 6 (A —C), since it is possible to vary the position of the supporting members as well as the number thereof used over a broad range, it is possible by the attachment of various type of slitting blades to obtain practically any type of network pattern, as desired, with coarse, fine, long or short slits, or combinations thereof. Needless to say, as a practical matter similar functions as those of the embodiment shown in FIGS. 6 (A —C) can also be demonstrated in the case of the rotating slitting member shown in FIGS. 5 (A —B), if grooves 110 are provided in a sufficient number.

In the aforesaid two types of rotating slitting members, the width of the blades in the circumferential direction is chosen to be usually 1 —10 mm. and the height of blades in the radial direction is chosen to be usually 2 —10 mm.

FIG. 7 illustrates another mode of the rotating slitting blade which can be used in the invention apparatus. The slitting is accomplished in this case by an action resembling clawing than cutting, and it comprises a body proper 111'' about whose surface are implanted a plurality of needle-shaped member 104''.

The clawing needle-shaped members 104'' are disposed in a plane which is perpendicular to a shaft 106'' such that they form an inclined angle $\beta$ of less than 90° to the tangent of the circumference. An inclination usually of 15 —40° is chosen for said angle $\beta$. The direction of rotation of the slitting members are usually indicated in the drawings with an arrow.

An important feature of invention method is that it can provide split tapes which exhibit a very uniform network pattern such as was utterly impossible of obtaining by such conventional procedures as abrasion, pounding or spraying of a fluid.

Another feature, as can be appreciated from the arrangement of the slitting blades and their mode of operation, is that since the sets of slitting blades, which are disposed at substantially equidistant intervals, form slits which are successively staggered a small distance in the axial direction and moreover such that the slits partly overlap, and hence the size of each single filament of the reticulated tape becomes still smaller than the interval between the slitting blades in the axial direction, the production of reticulated tapes having thin single filaments also becomes fundamentally an easy matter.

For illustrating the method and apparatus of this invention, the following examples are given. It is to be understood however that these examples are merely for illustrative purposes and is not to be construed as limiting the invention in any way whatsoever.

EXAMPLE 1

A film of polyethylene obtained by the low pressure process having an average molecular weight of 72,000 (calculated on the basis of the viscosity of the decaline solution at 135°C.) and melt index of 0.4 (determined by the method of ASTM (D123857T.) was cut into 10 mm. width. This tape was then stretched into tape having a thickness of 0.0272 mm. (This film had been obtained from a tubular film process by using a 65 mm. screw type extruder at the temperature of 170 —190°C. in the cylinder and 180°C. in the dice.)

Slits were formed in this stretched tape, using the rotating slitting apparatus shown in FIGS. 2 and 5 (A —B). The principal dimensions of the slitting apparatus were as follows:

Body proper of the rotating slitting member; Diameter, 30 mm.; Length, 137 mm.
No. of sets of teeth (supporting member), 12 sets; Teeth: Hight, 5 mm.; Intervals between teeth in the axial direction, 1 mm.

Phase difference between the sets of teeth:
The positions of the supporting members were adjusted so that the phase of the set of teeth which follows the first set is staggered one-third mm. axially of the first set, the phase of the third set is staggered a further one-third mm. axially, and the phase of the fourth set coincides with that of the first set.

The foregoing material stretched tape 10 was fed from the left side of the apparatus at a lineal speed of 60 m./min. to a pair of rotating nip rolls 102 and, after being split by coming into contact with splitting blades 104 of the rotating slitting member (rotating at 1,200 r.p.m.) which rotates in a counterclockwise direction, in a zone which is a part (about one-fourth of the circumference) of a circular arc described by the blades 104, it was wound up to the windup part 115 via a pair of rotating nip rolls 103.

The so obtained slitted tape had a slit pattern corresponding to that shown in FIG. 3-A, the length of the slits being 26.2 mm., the intervals between the slits in the longitudinal direction being of the same value and the intervals between the slits in the direction at right angles to the slits being 0.33 mm.

EXAMPLE 2

A polypropylene film having a molecular weight of 370,000 (calculated on the basis of the viscosity of the decaline solution at 135°C.) and a melt index (determined by the method of ASTM D1238-57T) was cut into a width of 15 mm., followed by stretching 7 X to prepare a 1,500 denier stretched tape (0.0916 mm. thick and 5.4 mm. wide). This film had been obtained from a tubular film processed by using a 65 mm. screw type extruder at a temperature of 170 —230°C. in the cylinder and 240°C. in the dice.

Slits were formed in this tape using the rotating slitting apparatus shown in FIGS. 2 and 6 (A —C). The principal dimensions of this slitting apparatus were as follows:

Body proper of the rotating slitting member, Diameter, 30 mm.; Length, 155 mm.
No. of sets of teeth (supporting member), 18 sets; Teeth: Hight, 5 mm.; Intervals between teeth in the axial direction, 0.6 mm.

Phase difference between the sets of teeth:

The positions of the supporting members were adjusted so that the phase of the set of teeth which follows the first set is staggered 0.2 mm. axially of the first set, the phase of the third set coincides with that of the first set, and the phase of fourth set is staggered 0.4 mm. axially of the third set.

The foregoing stretched tape was fed at a delivery speed of 72 m./min. and brought into contact with the rotating slitting member disposed between two pairs of pinch rolls and rotating at 3,300 r.p.m., in a zone whose extent was one-sixth of the circumference of the slitting member, to form slits in said tape, after which it was wound up onto a package 115.

The slit pattern of the tape obtained in this case corresponded to that shown in FIG. 3-B. It had a slit length of 17 mm., an interval between the slits 11 and 13 of about 5.7 mm., and the short and long intervals between slits 11 and 12, at right angles to the slits, were 0.2 mm. and 0.4 mm., respectively.

We claim:

1. An apparatus which comprises two pairs of nip rolls spaced apart and rotary slitting means mounted on a drive shaft and arranged between said two pairs of rolls so that fibrous material to be slit is advanced by said rolls over said rotary slitting means, said rotary slitting means including a body portion and a plurality of supporting members having a set of slitting blades and being axially slidably located on the periphery thereof and a screw member adapted to adjust the position of the set of slitting blades of each supporting member in the axial direction, the blades of each supporting member being parallel to each other in the axial direction of the body portion and equally spaced from each other in the axial direction of the body portion, adjacent sets of blades being axially staggered from each other and arranged in spaced relationship about the periphery of said body portion.

UNITED STATES PATENT OFFICE
CERTIFICATE OF CORRECTION

Patent No. 3,536,238                    Dated October 27, 1970

Inventor(s) IWAMA ET AL

It is certified that error appears in the above-identified patent and that said Letters Patent are hereby corrected as shown below:

Column 8, line 3, immediately after "An apparatus" the following should be inserted: "for producing a split fibrous material having a net-like structure of relatively thin and relatively thick filaments,"

(SEAL)
Attest:

Edward M. Fletcher, Jr.
Attesting Officer

WILLIAM E. SCHUYLER, JR.
Commissioner of Patents